C. C. CARPENTER AND R. J. ELLIS.
BATTERY JAR AND COVER.
APPLICATION FILED SEPT. 13, 1916.
1,336,507.
Patented Apr. 13, 1920.
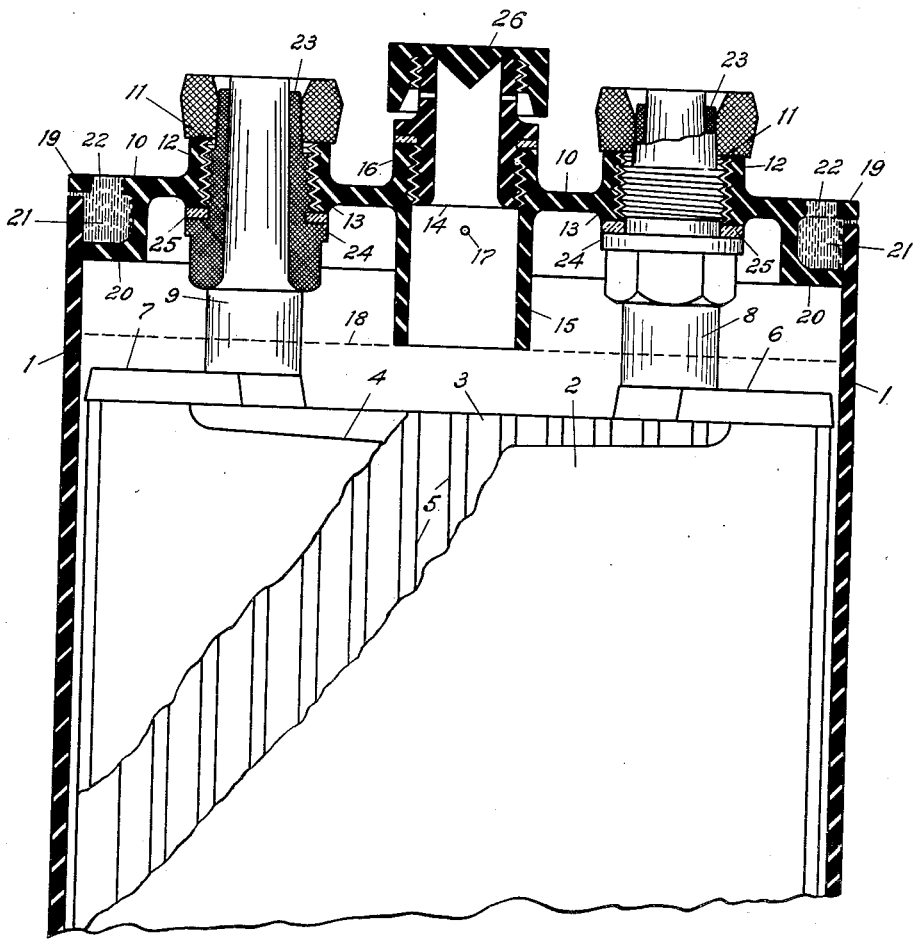
Witnesses
David H. Tinkler
Ralph Munden
Inventors
Campbell C. Carpenter
Roy J. Ellis.
By Raymond H. Van Nest
Attorney

UNITED STATES PATENT OFFICE.

CAMPBELL C. CARPENTER AND ROY J. ELLIS, OF NIAGARA FALLS, NEW YORK, ASSIGNORS TO U. S. LIGHT & HEAT CORPORATION, OF NIAGARA FALLS, NEW YORK, A CORPORATION OF NEW YORK.

BATTERY-JAR AND COVER.

1,336,507.  Specification of Letters Patent.  Patented Apr. 13, 1920.

Original application filed April 6, 1916, Serial No. 89,290. Divided and this application filed September 13, 1916. Serial No. 119,834.

*To all whom it may concern:*

Be it known that we, CAMPBELL C. CARPENTER and ROY J. ELLIS, citizens of the United States, residing at Niagara Falls, in the county of Niagara and State of New York, have invented new and useful Improvements in Battery-Jars and Covers, of which the following is a specification.

The present invention relates to battery jars and covers.

An object of the present invention is to provide a battery cell cover which will closely fit the jar of the cell and which may be effectually sealed thereto.

A further object is to provide a battery cell cover which will overlie the walls of the jar, whereby to avoid troughs or slots between adjacent battery cells.

Further objects will appear as the description proceeds.

This application is a division of our application No. 89,290, filed April 6, 1916, for battery cells.

The drawing represents a cross-sectional view of a battery cell having a cover according to the present invention.

The numeral 1 indicates the walls of a jar which may be of any suitable material as, for instance, hard rubber. Located within said jar are the usual battery plates and separators. One of said plates is indicated by the numeral 2. Said plate 2 is shown broken away to show a separator 3, which is also shown broken away to disclose a plate 4 of polarity opposite to plate 2. Separator 3 is shown as provided with the usual ribs 5. Plates 2, of like polarity, are united by a strap 6 joined thereto in the usual way. Plates 4 are also united by a strap 7. If desired, straps 6 and 7 may rest upon the tops of the separators, serving to hold said separators against movement. Integrally formed with the straps 6 and 7 are the posts 8 and 9. Straps 6 and 7 and posts 8 and 9 may be of lead or other suitable material.

The cell cover which constitutes the subject-matter of the present invention is indicated as a whole by the numeral 10. This cover may be of any suitable material, as for instance, hard rubber. Said cover is provided with two apertures 11, surrounded by collars 12 on the upper side of the cover and bosses 13 on the lower side of the cover. Said cover is provided with an opening 14 surrounded by a collar 15 on the under side of the cover and a boss 16 on the upper side thereof. Said collar 15 is provided with an aperture 17 which serves as a ventilating hole. The collar 15 should extend downwardly to the normal level of the electrolyte, which level is indicated by the broken line 18. The cover 10 is provided with edge portions 19 coinciding in contour and dimensions with the outside of the jar 1. Depending from the cover is a flange 20 formed to provide a trough extending around the cover. This trough is adapted to hold the sealing compound 21 which will be poured into said trough through apertures 22 in the cover. The sealing compound forms an effective seal to prevent the electrolyte from leaking between the cover and the walls of the jar.

The apertures 11 will be completely filled when the cell is in service. As illustrated, the cell posts 8 and 9 are provided with bushings 23 which may be of lead or other suitable material. The bushings 23 may be screw-threaded to engage the internally screw-threaded portions on the collars 12. The bushings 23 may be provided with collars 24 adapted to engage gaskets 25 of rubber or other suitable material. When said bushings are screwed in place, with the gaskets 25 tightly compressed between the collars 24 and the bosses 13, an effective seal is provided between each bushing and the collar. The particular construction of bushing illustrated and the particular means by which the apertures 11 are tightly closed, constitute no part of the present invention, said means being claimed in the application of which this is a division, mentioned above.

The opening 14 constitutes a passage-way for filling the jar with electrolyte and also permits the escape of gases. The opening 14 is closed by means of a cap 26 which is provided with suitable openings to permit the escape of gases. The particular means for closing the aperture 17 constitutes no part of the present invention.

It will be apparent that with the apertures 11 tightly closed, and with the cell cover tightly sealed to the walls of the jar, the only passage for communication between the inside of the jar and the outside air is through the opening 14, which passage may be suitably controlled. It will further be apparent that with the particular type of cell cover disclosed, there will be no grooves or troughs between adjacent cells for the collection of foreign matter.

One embodiment of the present invention has been described in detail. Various modifications will occur to those skilled in the art. It is intended in this case to cover all such modifications that come within the scope of the invention as defined by the appended claims.

Having described our invention, what we claim as new and desire to secure by Letters Patent of the United States is:—

1. In a battery cell, a jar and a cover, said cover having its outside edges coincident with the outside surface of the walls of said jar, said cover being provided near its outside edges with flanged portions, integral with said cover, said flanged portions being L-shaped in cross-section whereby to form a trough around said cover, said flanged portions being adapted to engage the inside walls of the jar, and sealing compound located in said trough whereby to form a tight seal between said jar and said cover, said cover being provided with holes above said trough and communicating with said trough.

2. A one piece cover for a battery cell provided with an outwardly facing U-shaped trough around its outside edges, said trough being adapted to receive a sealing compound, said cover being provided with holes above said trough and communicating with said trough.

3. In a battery cell, a jar and a cover, said cover having its outside edges coincident with the outside surface of the walls of the jar, said cover being provided near its outside edges with an integral depending portion forming with the upper part of the cover a trough extending around said cover, said cover being provided with holes above said trough and communicating with said trough.

4. In a battery cell, a jar and a cover, said cover having its outside edges coincident with the outside surface of the walls of the jar, said cover being provided near its outside edges with an integral depending portion forming with the upper part of the cover a trough extending around said cover, said depending portion being of such dimensions as to closely engage the inside walls of said jar, said cover being provided with holes above said trough and communicating with said trough.

5. In combination with a battery jar, a one piece cover provided with an outwardly facing U-shaped trough around its outside edges, the upper walls of said trough having outside edges corresponding substantially to the outside surface of the walls of said jar and the lower walls of said trough having outside edges corresponding substantially to the inside surface of said jar, said cover being provided with holes above said trough and communicating with said trough.

6. In combination with a battery jar, a one piece cover provided with an outwardly facing U-shaped trough around its outside edges, the upper walls of said trough having outside edges corresponding substantially to the outside surface of the walls of said jar and the lower wall of said trough having outside edges corresponding substantially to the inside surface of said jar, said upper walls being provided with apertures connecting with said trough.

7. In a battery cell, a jar and a cover, said cover having its outside edges coincident with the outside surface of the walls of the jar, said cover being provided near its outside edges with a depending portion integral therewith and forming with the upper part of the cover a trough extending around said cover, said cover being provided with apertures above said trough and communicating with said trough.

8. In combination, a battery cell, a jar, a cover for said jar, said cover having integral stepped portions adapted to fit inside of and over the top of said jar, said stepped portions having a trough therebetween for the reception of sealing compound, said cover being provided with holes above said trough and communicating with said trough.

In witness whereof, we have hereunto subscribed our names.

CAMBBELL C. CARPENTER.
ROY J. ELLIS.